April 22, 1941.  F. TURRETTINI  2,239,260
INDEXING DEVICE
Filed Feb. 3, 1940
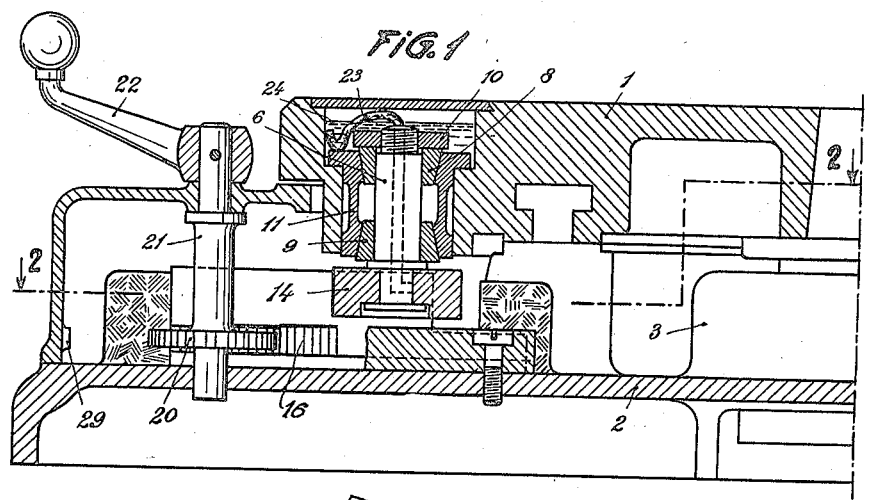
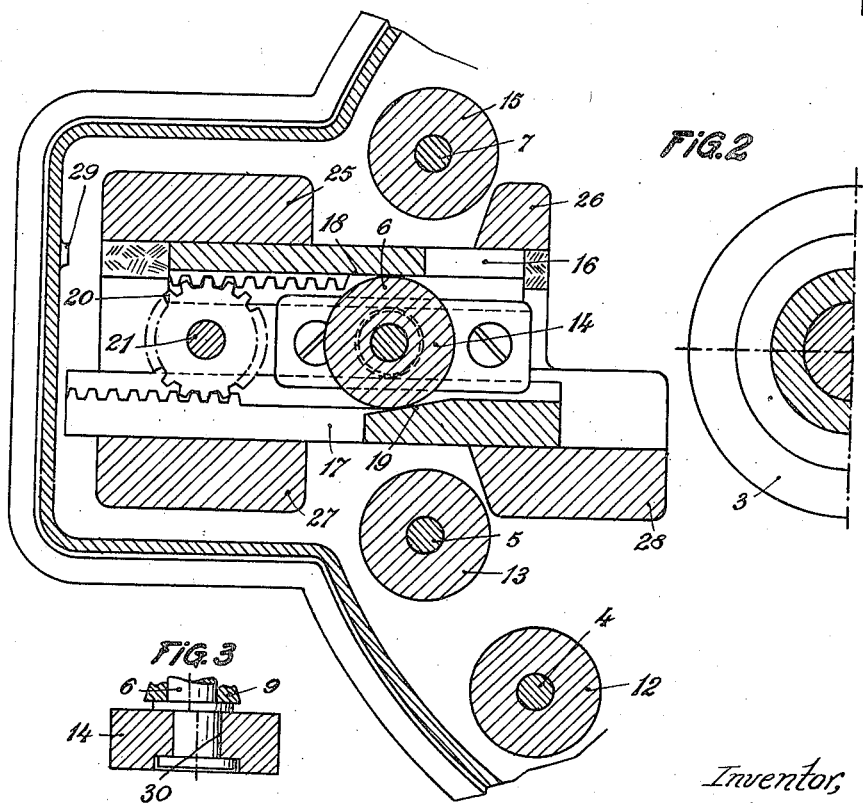
Inventor,
F. Turrettini
By: Glascock Downing & Seebold
Attys.

Patented Apr. 22, 1941

2,239,260

UNITED STATES PATENT OFFICE 2,239,260

INDEXING DEVICE

Fernand Turrettini, Bellevue-Geneva, Switzerland, assignor to Societe Genevoise d'Instruments de Physique, Geneva, Switzerland, a firm of Switzerland Application February 3, 1940, Serial No. 317,208
In Switzerland February 23, 1939

5 Claims. (Cl. 90—56)

The present invention relates to a device for maintaining the rotatable table of a machine tool in different predetermined positions.

The devices used in machine tools for this purpose are numerous and a high degree of accuracy is required thereof. Furthermore their handling must be a rapid one in order to diminish to a minimum the time wanted for the machining of the work pieces. For this reason preferably dividing devices defining a certain number of fixed angular positions are used and are known under the name of "indexing devices." Generally they comprise a disc provided with holes or notches or else with abutments integral with the rotatable disc or table of the device. Indexing plates of great dimensions, as used on boring or milling machines, are usually provided on their lower face with the wanted number of abutting surfaces formed by blocks or axles of hardened steel. The abutments co-operate with one or several bolts or wedges guided in the base of the device. The dividers of this kind permit to obtain a good precision, but unfortunately they are subjected to rapid wear on account of the friction produced between the surfaces which determine the assumed position of the indexing plate, when locking the bolts or wedges.

The object of the present invention is to avoid the above cited inconveniences by providing an indexing device which will not be subjected to wear. According to the invention the device comprises, on the one hand, on the table, for each of said positions a roller freely rotatable around a pivot mounted in said table, and on the other hand, on the frame of the machine, two sliding members guided in this frame and adapted to be shifted in opposite directions over equal way lengths by means of a common operating organ and being destined to clamp between each other the roller brought into juxtaposition thereto. In this manner any friction between the roller and the sliding members is avoided and, consequently, the wear as well of the surfaces determining the indexing position.

The accompanying drawing illustrates by way of example one embodiment of the present invention.

Figure 1 is a view of the embodiment in vertical, axial section.

Figure 2 shows a section along line 2—2 of Fig. 1.

Figure 3 shows a modification of a detail of the embodiment.

In the Figures 1 and 2, the table 1 of the machine tool rotates in a central bearing 3 of the machine frame 2. This table carries at its lower side a series of pivots 4, 5, 6, 7 . . . which define predetermined angular positions of the table. Each pivot is fixed in the table by means of two cones 8 and 9 of opposite taper in such a manner that by tightening the screw nut 10 the pivot gets rigidly fastened in the sleeve 11 which itself is fixed in the table plate and shows conical seats for the cones 8 and 9. It will be useful to split the conical pieces 8, 9 and 11 in order to give them a certain elasticity so that any play in the fixation can be suppressed by the single tightening of the screw nut 10.

The pivots 4, 5, 6, 7 . . . carry each a roller 12, 13, 14, 15 . . ., respectively, which rotates freely, however without play, a condition which is easily practicable if the pivot and the roller are both made of a very hard material, such as hardened steel.

The roller determining momentarily the assumed position of the table (see Fig. 2) is engaged between two sliding members 16 and 17 and is urged between their surfaces 18 and 19, the latter 19 of which is inclined with respect to the displacing direction of the sliding member 17. The two sliding members are simultaneously and parallelly movable along a radius of the table and over equal length of way by means of a pinion 20 rigidly mounted on a shaft 21 which can be operated by the handle 22. 29 is an abutment of the sliding member 16. Any other mechanical device could be used, which actuates the two sliding members 16 and 17 oppositely to each other and imparts displacements of equal way length upon them.

It is apparent that the simultaneous and equal displacement of the two sliding members in opposite directions effects at the moment of the tightening a slight rotation of the roller 14 around its pivot 6, whereby any slipping and wear of the periphery of the roller is prevented, in spite of the only linear contact with and the high pressure exerted by the surfaces 18 and 19. Furthermore it is apparent that the bore of the roller, as well as the corresponding portion of the pivot are not worn, as the effort thereupon is weak and is distributed over a relatively large surface, which can easily be lubricated (for instance by means of the wick 23 being dipped into the oil bath 24).

The angle of inclination of the surface 19 is rather small in order that the clamping of the roller be irreversible.

Figure 2 shows the indexing device locked upon the roller 14. If the handle 22 is turned in anticlockwise direction, the sliding member 16 is shifted to the left and the other one 17 to the right. This unlocking movement is limited by the abutment 29. The clamping surfaces 18 and 19 of the two sliding members are of such size that in unlocking position the rollers 12, 13, 14, 15 ... can freely pass between the guides 25—26, and 27—28 without touching the sliding members, thus permitting the free rotation of the table 1 for bringing it into a new position. To lock the device again, it is sufficient to turn the handle 22 in clockwise direction, wherethrough the roller will be clamped between the surfaces 18 and 19.

For rendering the position of the divider independent from errors of manufacture of the index plate 1, the pivots 4, 5, 6, 7 ... can be eccentrical as shown in Figure 3, that is to say, the axis of the portion 30 around which the roller rotates is eccentric with respect to the body of the pivot so that the tangential position of the roller could be adjusted to a certain extent by rotating the pivot; this will be sufficient to render, for instance, the spacing of the rollers perfectly regular.

It is to be understood that the invention is not limited to that which is illustrated in the drawing; in particular could the space between succeeding rollers be unequal.

I claim:

1. Device for maintaining the rotatable table of a machine tool in different predetermined positions, having in combination a frame, a table mounted for rotation on said frame, a series of pivots on said table to define the determined angular positions thereof, for each of said pivots a roller mounted to freely rotate thereon, two sliding members guided in said frame and adapted to be shifted in opposite directions over equal way lengths, and a common operating member for actuating simultaneously both said members, each of the rollers being adapted to be brought into juxtaposition to the sliding members, and said members being destined to clamp said roller between each other.

2. Device for maintaining the rotatable table of a machine tool in different predetermined positions, having in combination a frame, a table mounted for rotation on said frame, a series of pivots on said table to define the determined angular positions thereof, for each of said pivots a roller mounted to freely rotate thereon, two sliding members guided in said frame and adapted to be shifted in opposite directions over equal way lengths, a rack formed on each of said members, and a common operating pinion meshing with said racks for actuating simultaneously both said members, each of the rollers being adapted to be brought into juxtaposition to the sliding members, and said members being destined to clamp said roller between each other.

3. Device for maintaining the rotatable table of a machine tool in different predetermined positions, having in combination a frame, a table mounted for rotation on said frame, a series of pivots on said table to define the determined angular positions thereof, means for fixing each pivot to said table, said means comprising two cones of opposite taper placed upon the pivot, a sleeve secured to the table and having tapered seats to engage said cones, said cones and sleeve being split so as to be elastic, and an axial tightening device acting upon said cones and adapted to suppress any play in the fixation, for each of said pivots a roller mounted to freely rotate thereon, two sliding members guided in said frame and adapted to be shifted in opposite directions over equal way lengths, and a common operating member for actuating simultaneously both said members, each of the rollers being adapted to be brought into juxtaposition to the sliding members, and said members being destined to clamp said roller between each other.

4. Device according to claim 3 in which the two sliding members are guided so as to move parallelly to each other along a radius of said rotatable table to contact with the juxtaposed roller, the contact surface of one of said members being parallel to the direction of displacement and the contact surface of the other of said members being inclined to said direction so as to act as a wedge for clamping said roller.

5. Device according to claim 3 in which pivots carrying the rollers are eccentric with a view to adjusting the positions of said rollers one to another.

FERNAND TURRETTINI.